N. C. NICHOLSON.
FISH CLEANING MACHINE.
APPLICATION FILED MAR. 1, 1916.

1,217,809.

Patented Feb. 27, 1917.
6 SHEETS—SHEET 1.

UNITED STATES PATENT OFFICE.

NIELS C. NICHOLSON, OF SEATTLE, WASHINGTON, ASSIGNOR OF ONE-HALF TO T. A. HECKMAN, OF SEATTLE, WASHINGTON.

FISH-CLEANING MACHINE.

1,217,809.   Specification of Letters Patent.   Patented Feb. 27, 1917.

Application filed March 1, 1916. Serial No. 81,462.

*To all whom it may concern:*

Be it known that I, NIELS C. NICHOLSON, a citizen of the United States, residing at Seattle, in the county of King, State of Washington, have invented certain new and useful Improvements in Fish-Cleaning Machines; and I do hereby declare the following to be a full, clear, and exact description of the invention, such as will enable others skilled in the art to which it appertains to make and use the same.

This invention relates to fish-cleaning apparatus and has for its object to provide a power-driven machine into which fish may be introduced and which, during the passage of the fish therethrough will split and thoroughly clean the fish, delivering them free of all waste matter. Another object is to provide a machine of this kind including a number of separate cleaning instruments which will be simultaneously adjustable to the accommodation of fish of different sizes and which will be individually adjustable to compensate for wear.

Other objects and advantages will be found in the following specifications:

Referring, now, to the drawings the present invention comprises a table 15 including ends 16 and 17 and connecting braces 18.

Figures 3, 8, 9:
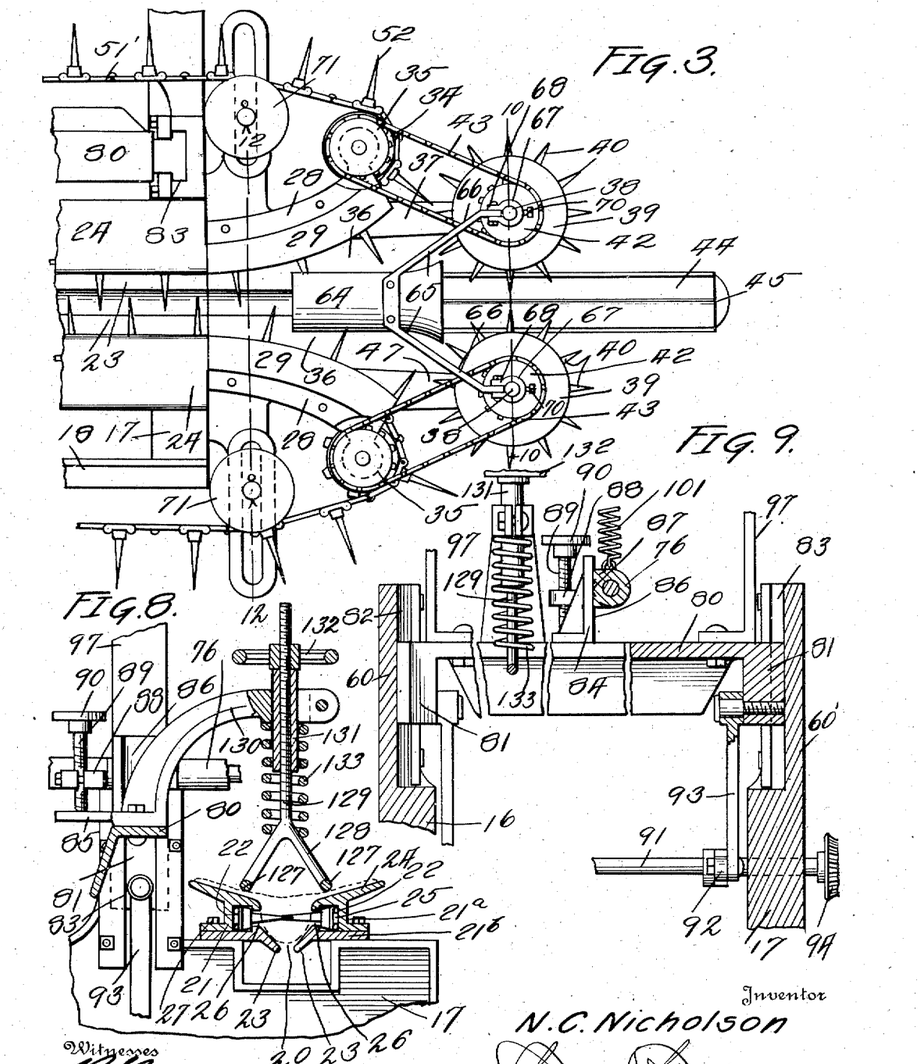
Fig. 3 is an enlarged plan of the feed mechanism with the cover plates removed.
Fig. 8 is a detail section through the mounting of the keeper rods and adjacent parts.
Fig. 9 is a detail view part section illustrating the mounting of the adjusting frame.
Figure 4:
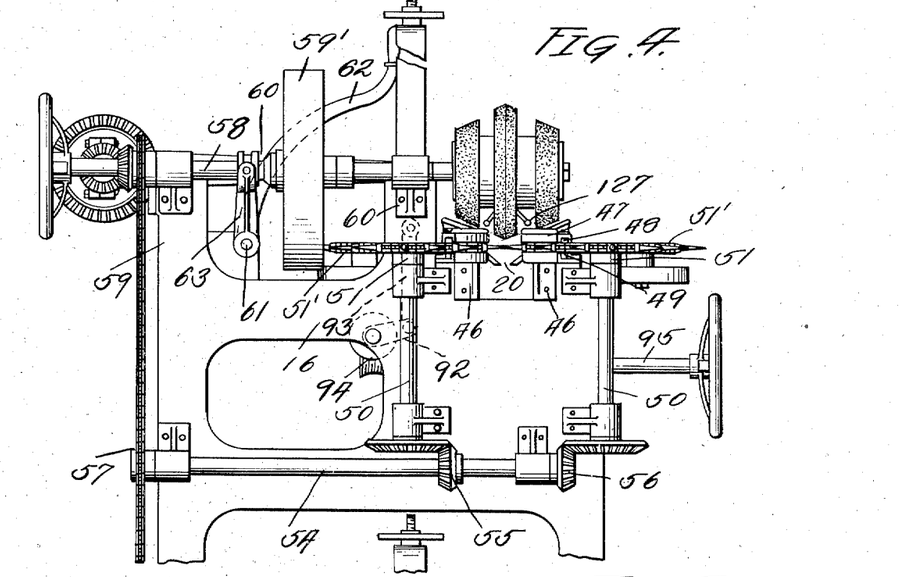
Fig. 4 is an elevation of the discharge end.
Figure 5:
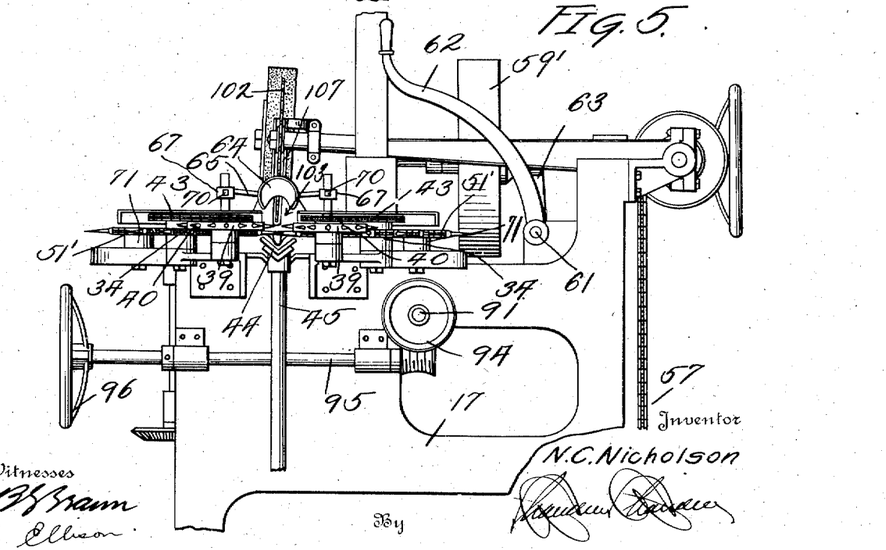
Fig. 5 is an elevation of the feed end.

Mounted upon the table adjacent to what will be termed the forward side 19 thereof, there is a longitudinal guide way 20 formed by two parallel guide members 21. Each guide member has a vertical inner face 22 and carries at its lower inner edge a downwardly and inwardly slanted flange 23, these flanges being spaced apart at their inner edges and forming a V-shaped track which is open at its bottom as indicated in Fig. 8. Each guide member also has a relatively broad upper face 24, and these faces are inclined downwardly and inwardly. Formed longitudinally within each member there is a passage 25 opening through the ends of the member, and formed in the inner vertical face 22 of each member there is a longitudinal slot 26 which communicates with the passage 25. As shown, each member 21 consists of two sections 21ª and 21ᵇ held together by suitable fastenings 27.

Secured to the feed end 17 of the table and extending outwardly therefrom there are two mountings 28, one at each side of the guide way 20. These mountings each include horizontal portions 37, which carry downwardly and inwardly inclined flanges 36 forming continuations of the flanges 23 and 24. The mountings also include upwardly extending portions 29, one lying in alinement at its inner end with each of the members 21.

The portion 29 of each mounting has a vertical face 31 lying at its inner end flush with the vertical face 22 of the corresponding member 21, these vertical faces 31 being slotted as indicated at 32 in continuation of the slots 26, and the slots 32 communicate with the passages 33 corresponding to the passages 25 and forming continuations thereof. The portions 29 are curved, as shown, to cause their vertical faces to diverge outwardly from the end of the table, and the passages 33 and slots 32 follow this curvature. At the outer ends of the portions 29 there are journaled horizontal sprockets 34, and connected with these sprockets for rotation therewith there are additional sprockets 35 for a purpose to be presently described.

The portions 37 of the mountings extend outwardly beyond the portions 29 and beyond the ends of the flanges 36 and at the outer extremities of the portions 37 there are mounted upwardly extending stub shafts 38. Each of these shafts 38 has a horizontal wheel 39 journaled thereon and each wheel carries a plurality of radial teeth 40 upon its periphery. A sprocket 42 is carried upon each of the wheels 39, and these sprockets are driven by chains 43 engaged therewith and with the sprockets 35, the sprockets 42 being secured to the wheels 39 for rotation thereof. The wheels 39 are disposed in a common horizontal plane in spaced relation to each other, and during rotation of the wheels the teeth 40 pass through the space between the wheels. Directly below the paths of movement of the teeth as they pass between the wheels there is a longitudinal feed chute 44 which lies at its inner end upon the outer ends of the flanges 36, and which is supported at its outer end by an upright 45. This structure is clearly shown in Fig. 3.

At the discharge end 16 of the table there are two members 46, one at each side of the guide way 20, and these members have inner vertical faces 47 slotted as at 48 to communicate with interior passages 49. The members 46 are curved to cause their inner faces to diverge outwardly of the table, these faces being flush with the inner faces of the members 21 at their inner ends, the slots 48 forming continuations of the slots 26 and the passages 49 forming continuations of the passages 25. The slots and passages of the members 46 follow in the curvature of the faces 47. From the foregoing it will be seen that the members 21, the members 46 and the portions 29 of the mountings 28 coöperate to form two spaced guides which are parallel throughout the major portions of their lengths but which have their ends directed outwardly upon curved lines, and it will also be seen that the guides thus formed have longitudinal channels formed therewithin and opening through the mutually adjacent faces thereof, these channels being formed by the registering slots 26, 32 and 47 and the registering passages 25, 30 and 49.

Shafts 50 are journaled vertically upon the end 16 of the table, one at each side of the two members 46, these shafts carrying sprockets 51 at their upper ends, lying in the horizontal plane of the sprockets 34 and also in the plane of the passages 25. There is thus a sprocket at each end of the guide way 20 at each side thereof, and trained around the corresponding pairs of sprockets there is an endless chain 51', these chains being engaged in the passages 25, 30 and 49 throughout their inner lengths. The chains 51' carry outwardly directed teeth 52 which, projecting through the slots 26, 32 and 48, extend into the guide way 20 above the flanges 23 and 36.

A horizontal shaft 54 is journaled upon the end 16 of the table and is geared to the shafts 50 as indicated at 55 and 56 for rotation of the shafts 50 in opposite directions, and this shaft 54 is operatively connected as shown at 57 with a shaft 58, mounted on uprights 59 and 60 carried by the end 16 of the table, this shaft 58 lying in a plane above that of the guide members 21. Loosely mounted upon the shaft 58 there is a belt-wheel 59', and clutch mechanism 60 is provided by means of which the shaft 58 may be locked to the wheel 59' for rotation thereby. A clutch operating shaft 61 extends throughout the length of the table and carries a handle 62 at the feed end of the table, through the medium of which handle the shaft may be rocked. A lever 63 is carried by the shaft 61 and engages the clutch mechanism 60 for operation thereof through rocking movement of the shaft 61.

From the foregoing it will be seen that with the two shafts 50 rotating outwardly, or counter-clockwise the inner portions of the chains 51' will be moved toward the discharge end of the machine, and the two wheels 39 will be rotated to move their teeth also toward the discharge end of the machine as they pass over the feed chute 44. Thus, if a fish be disposed upon the feed chute 44 and moved until it is engaged by the teeth 40, it will be carried into position to be engaged by the teeth 52 of the chains as they move inwardly with the curvature of the portions 29 of the mountings 28, and when so engaged, will be carried through the guide way to the discharge end of the machine, the fish resting upon the V-shaped track which is formed by the flanges 23 and 36.

Figures 2, 14:
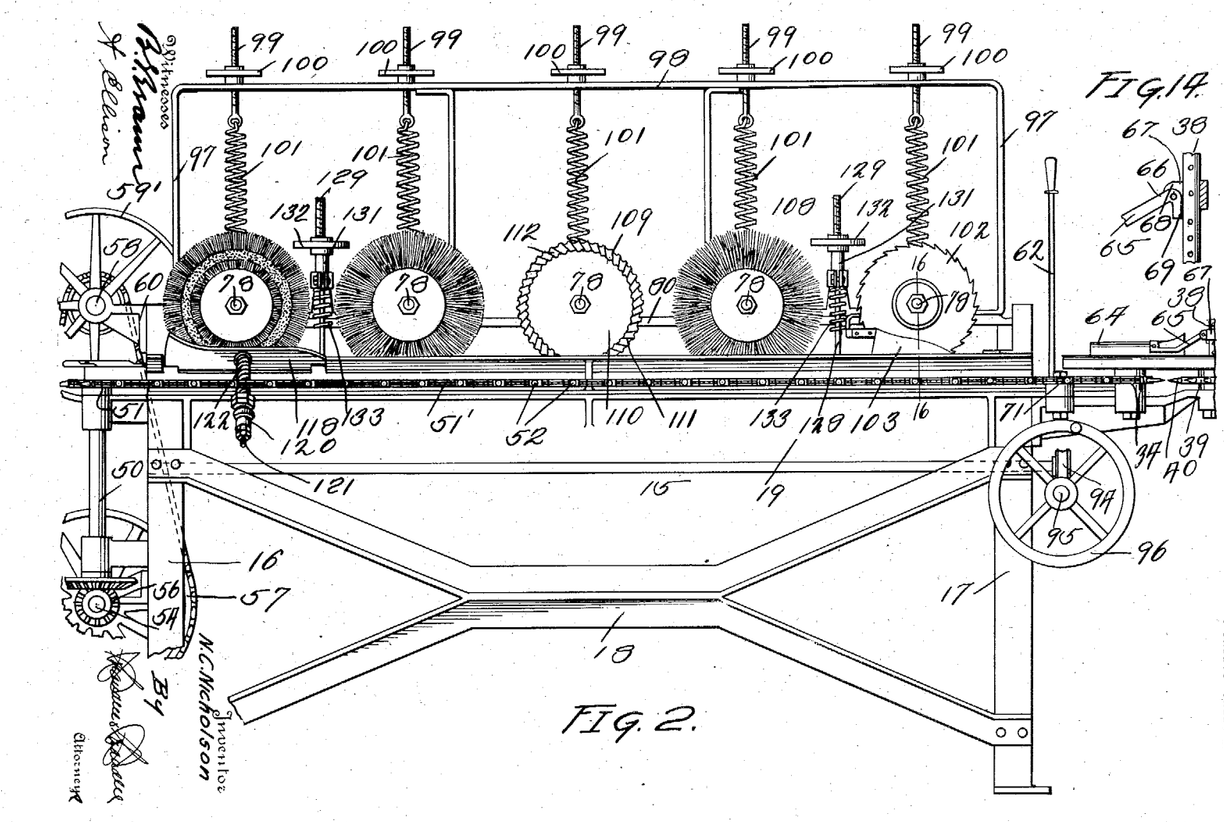
Fig. 2 is a side elevation of Fig. 1.
Fig. 14 is a detailed section showing the pivotal mounting of the hood yoke.

To correctly position the fish for engagement by the teeth 52, there is provided a longitudinally extending hood 64 which is arcuate in cross section and which is disposed just inwardly of the wheels 39 and above the outer portions of the flanges 36, with its outer end projecting just over the feed chute 44 at the inner end thereof. This hood 64 is supported by a yoke 65, having divergent arms 66, pivoted at their ends to collars 67 slidably mounted upon the shafts 38 at the upper ends thereof. As shown in Fig. 14, the ends of the yoke are pivoted between ears 68 carried by the collars, and thus while the yoke is free to move upwardly upon its pivots, downward movement of the yoke is limited by the engagement of fingers 69 with the shafts 38. Set screws 70 are engaged in the collars and operate against the shafts to hold the collars at different points of their vertical movement, so that the yoke 65 and the hood 64 may be adjusted vertically to suit different conditions.

Idler sprockets 71 are adjustably connected with the mountings 28 and lie against the inner faces of the outer portions of the chains 51, the adjustment of these sprockets being such as to permit of variation of the tension of the chains.

Figure 1:
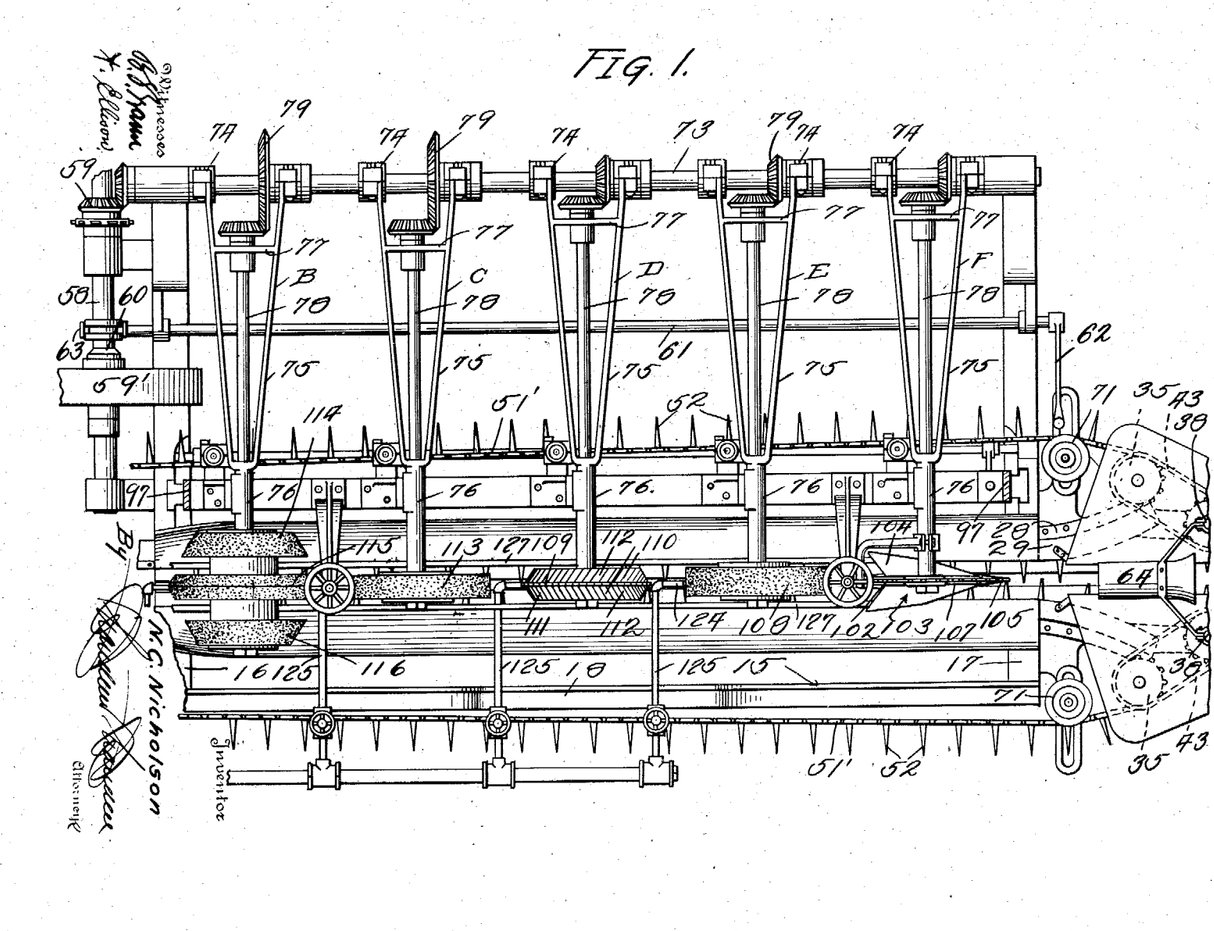
Figure 1 is a top plan of the machine, a portion of the feed mechanism being broken away.

Journaled at the rearward side of the table in the horizontal plane of the shaft 58 there is a longitudinal shaft 73 which is geared to the shaft 58 for rotation thereby as indicated at 59 and pivotally engaged with this shaft are the spaced rearward ends 74 of forwardly extending yokes B, C, D, E, and F, the arms 75 of the several yokes converging toward each other in each instance and carrying at their forward ends a bearing sleeve 76. Between the arms 75 of each yoke there is a cross-brace 77 located adjacent to the rearward end of the yoke and journaled in each of these cross-braces is a rearward end of a shaft 78, the forward ends of these shafts being journaled in the sleeves 76 and projecting beyond the forward ends thereof to extend over the space between the guide members 21. Each of the shafts 78 is operatively connective with the shaft 73 through the medium of beveled gears 79, the ratio of these gears for the shafts located in the yokes B and C being higher than those of the remaining shafts. It will be seen by reference to Fig. 1 that the yokes B, C, D, E, and F are movable vertically upon their pivotal connection with the shaft 73.

The forward end of each of the shafts 78 carries a fish-treating device which will be later specifically referred to and described, it being understood that these devices lie in position to engage and operate upon a fish as it passes through the machine.

To move the several shaft-carrying yokes vertically upon their pivotal connection with the shaft 73, a bar 80 is provided, which extends longitudinally of the table beneath the rearward ends of the sleeves 76. This bar 80 has blocks 81 at its ends, one of these blocks being slidably engaged in a vertical guide slot 82, formed in the inner face of the upright 60, while the other block 81 is engaged in a similar guide slot 83 formed in the inner face of an upright 60' located in alinement with the upright 60 at the end 17 of the table. Secured to the bar 80 adjacent to each of the sleeves 76 there is a casting 84, each casting having a rearwardly extending horizontal leaf 85 and a vertically extending leaf 86. These castings are disposed with their leaves 86 against the sides of the sleeves 76 which lie toward the discharge end of the machine, and the sleeves are flattened at the point of engagement as indicated at 87. These leaves 86 thus receive the thrust incident to the operation of the shafts 78 as will be understood. Each sleeve 76 carries a lateral ear 88 lying above the leaf 85 of the adjacent casting 84, and threaded through each of these ears 88 there is a shaft 89 carrying a hand-wheel and resting at its lower end upon the leaf 85, these shafts 89 thus form supports for the forward ends of the yokes B, C, D, E, and F and through their engagement in the ears 88 provide means for adjusting the yokes vertically independently of each other, this vertical adjustment also moving the forward ends of the shafts 78 with the yokes as will of course be understood. Since the several yokes are thus supported upon the castings 84 which are carried by the bar 80, it will be seen that vertical movement of the bar will result in vertical movement of all of the shaft-carrying yokes simultaneously.

To move the bar 80 vertically there is provided a shaft 91 journaled in the ends of the table and carrying lateral arms 92 which are connected by means of links 93 with the blocks 81. This shaft 91 has worm and pinion connection 94 with a transverse shaft 95 provided with a hand-wheel 96, through the medium of which the elevation of the bar 80 and the several shafts 78 may be finely adjusted.

A vertical frame 97 is mounted upon the bar 80 and has a top member 98 through which there are engaged threaded rods 99, one of these rods lying above each of the yokes B, C, D, E and F. Hand-wheels 100 are threaded upon the rods 99 and rest upon the top member 98 for operation to move the rods 99 vertically through the top member, these rods being slidable in the top member as will be understood. Helical springs are engaged with the lower ends of the rods 99 and with the several sleeves 76, and act as balance springs to support the free ends of the yokes B, C, D, E and F and the portions carried thereby. These helical springs are indicated at 101.

As will be seen by reference to Fig. 2 of the drawings the shafts 78 are arranged one after another longitudinally of the machine. The shaft 78 of the yoke F which lies nearest the feed end of the machine carries a circular saw 102, and embracing this saw at the lower portion thereof there is a guide and spreader foot 103. This spreader foot includes two downwardly extending deflected plates 104 connected at their forward ends by a finger 105. An arm 106 is connected with the foot and with the sleeve 76 of the yoke F, this arm being split to accommodate the saw as shown at 107. The finger 105 is directed toward the feed end of the machine and the plates 104, diverging rearwardly from the finger as shown, extend over the inclined faces 24 of the guide members 21. As will be later more clearly explained, the foot 103 serves to first position a fish so as to be cut by the saw 102 and to then spread the sides of the fish apart and down against the inclined faces 24.

The shaft 78 of the yoke E which lies next to the yoke F, carries a circular brush 108. The shaft 78 of the yoke D, which lies next to the yoke E carries a circular saw 109 and at each side of this saw there is a disk 110 having its periphery beveled as indicated at 111 so that the two disks present a convex surface, and these beveled faces of the disks are provided with diagonal ribs 112. The shaft 78 of the yoke C which lies next to the yoke D carries a circular brush 113, and the shaft 78 of the yoke B which lies adjacent to the discharge end of the machine carries three cylindrical brushes 114, 115 and 116, as illustrated. The brush 115 is located between the brushes 114 and 116 and the peripheries of the brushes 114 and 116 are beveled to give the brushes a frusto-conical form, the bases thereof being directed inwardly. Directly below the brushes 114 and 116, the guide members 21 have their upper portions cut away and pivoted to the guide members in these cut-away portions there are two plates 117 and 118, which extend longitudinally and which are movable upon their pivots toward and away from the brushes 114 and 116.

Outwardly extending brackets 119 are secured to the members 21 and carry exteriorly threaded sleeves screwed thereinto. These sleeves have rods 121 engaged therein for sliding movement, and these rods are pivoted to the plates 117 and 118. Springs are engaged with the rods and are indicated at 122. These springs bear against the plates 117 and 118 and bear also against the sleeves 120. The springs thus hold the plates 117 and 118 yieldably against movement away from the brushes 114 and 116, and the tension of the springs may be varied through adjustment of the sleeves 120 in the brackets 119.

Figures 6, 7, 15:
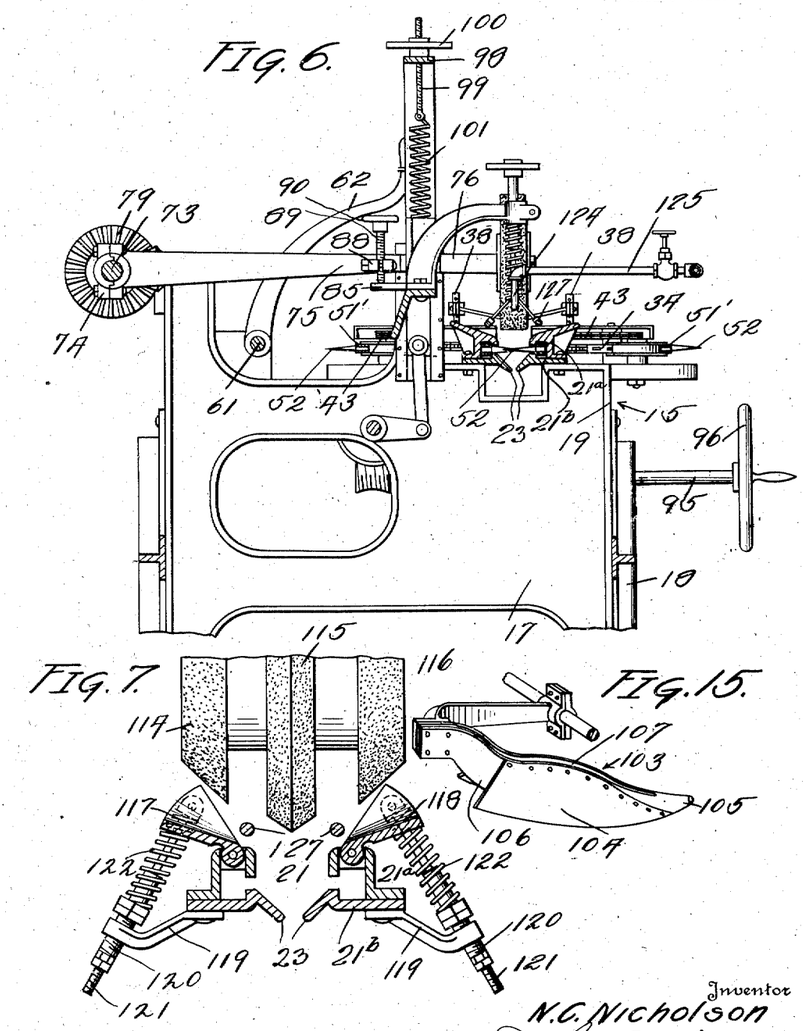
Fig. 6 is a transverse section through the machine.
Fig. 7 is an enlarged detail of the finishing brushes and the fish supports which coöperate therewith.
Fig. 15 is a perspective view of the spreader foot.
Figures 10, 12, 16:
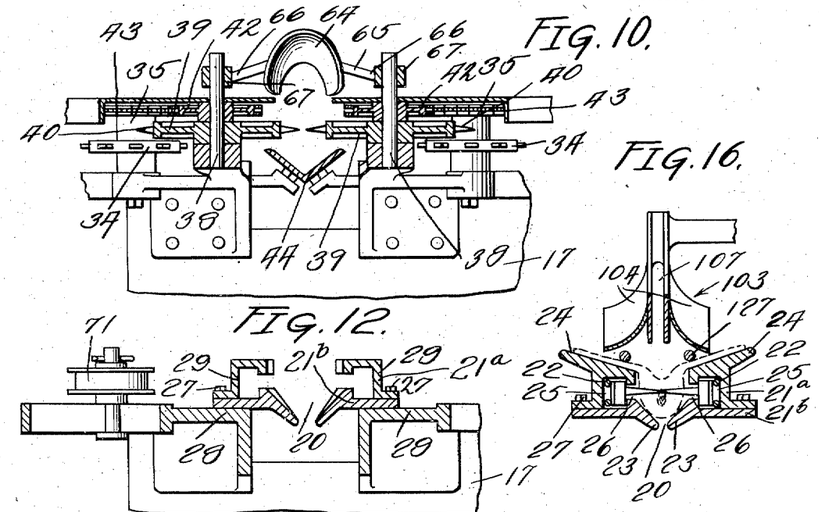
Fig. 10 is a section on line 10—10 of Fig. 3.
Fig. 12 is a section on line 12—12 of Fig. 3.
Fig. 16 is a section on line 16—16 of Fig. 2, showing the relation of the keeper rods to the foot, the section being also taken through the guide members, with portions of the mechanism removed.
Figures 11, 13:
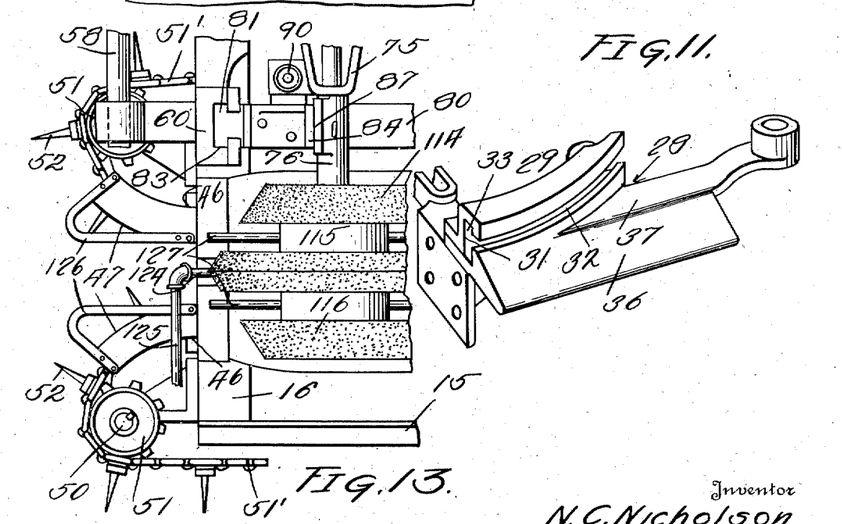
Fig. 11 is a perspective view of one of the mountings at the feed end of the machine.
Fig. 13 is an enlarged top plan of the discharge end of the machine.

As shown in Fig. 2, the plates 117 and 118 lie with their ends which are directed toward the feed end of the machine flush with the inclined faces 24 of the guide members, and at their rearward ends the plates are curved upwardly to follow, approximately, the curvature of the brushes 114 and 116. This structure is also shown in Fig. 7, and it will be noted that the central brush 115 has its periphery beveled from its center to its sides so as to give the brush a convex surface.

Before describing further details of the machine the operation of the mechanism will be now set forth so that the purpose and structure of additional parts may be more readily understood.

Fish from which the heads and fins have been removed are disposed upon the feed chute, backed down, and are moved so as to be engaged by the teeth 40. The rotation of the wheels 39 will carry the fish into the hood 64, which may rise if necessary to accommodate the fish but which will serve to hold the fish upright between its sides until the fish has been engaged by the teeth 52 of the chains 51' as they pass around the curved portions 29 of the mountings 28. The weight of the hood 64 will have brought the fish down upon the flanges 36 and the fish will thus rest upon the V-shaped track formed by these flanges and by the flanges 23 during its movement through the machine. When the fish reaches the foot 103, the finger 105 thereof will engage within the gut and hold the latter in position to be cut by the saw. As the fish is cut, the separated sides will pass along the under edges of the plates 104 of the foot and will be pressed down upon the faces 24 of the guide members. When the fish comes into contact with the brush 108, the greater portion of waste material will be removed. The saw 109 is for a special purpose. The body of a fish has a thin membrane across the inner surface of the spine, between which and the spine there is a quantity of blood. The purpose of the saw 109 is to cut this membrane and the purpose of the ribbed disks 110 is to remove the blood from beneath the membrane. The brush 113 serves to remove the clinging portions of the membrane, and the brushes 114, 115 and 116 serve to finish the cleaning operation, the sides of the fish being brought up against the brushes 114 and 116 by the plates 117 and 118 which are allowed to yield by the springs 122 to accommodate fish of different thicknesses. Through the means provided for moving all of the shafts 78 vertically at their free ends, which means includes the bar 80 as already described, all of the fish-treating devices just mentioned may be moved vertically to accommodate different runs of fish, and the individual fish-treating devices may be adjusted independently of each other through the medium of the shafts 89 and the hand-wheels 90. As previously stated, the balance springs 101 carry the greater portion of the weight of the yokes B, C, D, E and F and the parts associated therewith so that the different instruments will automatically be raised or will fall to accommodate slight differences in size of fish.

As shown, the gearing of the several parts of the machine is such as to rotate the fish-treating devices against the movement of the fish, and at different points throughout the path of the movement of the fish there are the outlets 124 of water pipes 125 arranged to discharge upon the fish.

To carry the fish in a straight line from the discharge end of the machine and assure proper disengagement of the teeth 52 from the fish as the chains pass around the sprockets 51, two rods 126 are provided which extends longitudinally beyond the discharge end of the table in position to receive the fish therebetween as they pass from between the guide members 21, these rods being so disposed that the teeth 52 move laterally with respect thereto as the chains pass around the sprockets 51.

To hold the sides of the fish firmly against the inclined faces 24 of the members 21, two keeper rods 127 are provided, these rods extending longitudinally and lie one above each of the members 21. At their ends adjacent to the feed end of the machine, these rods lie between the plates 104 of the foot 103, so that the fish are fed beneath these rods by the foot. The rods 127 are held in place by upwardly extending yokes 128 connected with vertical rods 129. To support these rods brackets 130 are mounted upon the bar 80 and project toward the forward side of the table and over the guide way 20. These brackets carry vertical sleeves 131 within which the rods 129 are slidably engaged. The rods 129 project above the sleeves 131 and have hand-wheels 132 threaded upon their upper ends and bearing against the upper ends of the sleeves for adjustment of the rods vertically. Springs 133 are engaged around the rods 129, bearing at their upper ends against the brackets 130 and at their lower ends against the yokes 128. These springs serve to hold the yokes 128 with the rods 127 firmly against the sides of the fish thus pressing the latter down against the members 21, but the springs 133 permit of upward movement of the rods 127 to accommodate fish of different thicknesses. Since the keeper rods 127 are connected with the bar 80, these keeper rods are adjusted correspondingly with the adjustment of the fish-treating devices when the bar 80 is moved vertically. Cover plates X are provided for portions of the mechanism at the feed end of the machine.

What is claimed is:

1. A fish-cleaning machine comprising a plurality of fish-treating devices, means for moving fish into position to be treated by the different devices successively, means for simultaneously adjusting the devices with respect to the moving means, and means for individually adjusting the devices with respect to the moving means.

2. A fish-cleaning machine comprising a fish-treating device, a fish-carrier arranged to position a fish for treatment by the treating device, means for moving the treating device toward and away from the carrier, said treating-device being movable with respect to the carrier independently of the moving means, and means for adjusting the treating devices with respect to the moving means to vary its position with respect to the carrier.

3. A fish-treating machine including a fish-splitting device, means for moving a fish into engagement with the splitting device, a cleaning device, said moving means being arranged to carry a fish from the splitting device to the cleaning device for treatment thereby, means for supporting a fish in position to receive the operation of the cleaning device, a single means for introducing a fish to the splitting device and for spreading the fish, and means for holding a fish spread upon the supporting means, said introducing and spreading means being arranged to position the fish for engagement by the holding means.

4. A fish-treating machine including fish supports, a plurality of fish-treating devices located in position to treat fish upon the supports, said treating devices being movable toward and away from the supports, means for moving the treating devices simultaneously with respect to the support and means for moving the treating devices individually with respect to the supports.

5. A stationary fish-treating machine including fish supporting means, means for moving the fish along the supporting means, a fish-treating device movable toward and away from the supporting means, means for moving the treating device with respect to the supporting means and means for holding moving fish upon the supporting means, said holding means being connected with the moving means for movement therewith.

6. A fish-treating machine including a fish-treating device, means for moving fish into position to receive treatment by the device, means for feeding fish to the moving means, means for supporting fish so fed, and means for guiding fish from the feeding means to the moving means, said guiding means being movable toward and away from the supporting means through engagement by fish, and being also adjustable toward and away from the supporting means.

7. A fish-treating machine including spaced fish-carrying chains mounted for movement of the mutually adjacent portions in a common direction and having resultant feed and discharge ends, means for moving the chains, means for treating fish carried by the chains, fixed shafts mounted outwardly of the feed ends of the chains, spaced toothed wheels revolubly mounted upon the shafts and lying at opposite sides of the space between the chains, means for rotating the wheels to move their inner portions toward the chains, fish-supporting means located below the wheels and below the chains, means for guiding fish from between the wheels to the space between the chains, and a support for the guiding means secured thereto and pivotally connected with the shafts for vertical movement of the guiding means, said connection being also arranged for bodily vertical adjustment of the guiding means.

8. A fish-treating machine including a drive-shaft, a shaft extending laterally from the drive-shaft and geared thereto, said lateral shaft being mounted for pivotal movement with the drive-shaft as a center, a support for the outer end of the lateral shaft, said support being movable to move the lateral shaft pivotally, a fish-treating device carried by the outer end of the lateral shaft and means for supporting a fish in position to receive the operation of the fish-treating device.

9. A fish-treating machine including a drive-shaft, a plurality of laterally extending members pivoted upon the drive-shaft, shafts journaled in the latter members and extending laterally from the drive-shaft, driving connections between the drive-shaft and the lateral shafts, said members and their shafts being movable pivotally with the drive-shaft as a center, vertically movable means for supporting the free ends of the lateral members, fish-treating devices carried by the lateral shafts for rotation therewith and fish moving means arranged to present fish in position to be treated by the different fish-treating devices successively.

10. A fish-treating machine including a fish support, a fish-treating device mounted above the fish support in position to treat fish upon the support, means for moving fish along the support beneath the fish-treating device, said fish-treating device being movable away from the support to accommodate fish of different thicknesses, means for positively moving the treating device with respect to the support and means movable with said moving means for adjusting the treating device with respect to said moving means.

11. A fish-treating machine including a table, fish-supporting means extending longitudinally of the table adjacent to its forward side, a drive-shaft mounted at the rearward side of the table above the plane of the supporting means, a lateral shaft geared to the drive-shaft and mounted for vertical pivotal movement with the drive-shaft as the center, said lateral shaft extending over the supporting means, a fish-treating device carried by the free end of the lateral shaft and lying in position for engagement of fish upon the supporting means, a vertically movable support for the free end of the lateral shaft, means for moving said vertical movable support, said lateral shaft being vertically movable independently of its support, an upwardly extending frame connected with the vertically movable support, and a balance spring adjustably connected with the frame and connected with the lateral shaft.

12. A fish-treating machine including spaced fish supporting and guiding members, a fish-treating device located in operative relation to the said members, endless chains located one at each side of the space between the members, fish engaging teeth carried by the chains and projecting into the space between the members, said chains being mounted for movement to move the teeth longitudinally of the members, said chains being also mounted for movement laterally and outwardly from the members at one end, and stationary members mounted in alinement with the guiding and supporting members at the just mentioned end thereof and between the ends of the chains to carry a fish in a straight line from the ends of the guiding members.

13. A fish-treating machine including spaced parallel members arranged for the reception of fish therebetween, endless conveyers disposed each with a length at one side of the space between the members and including fish engaging portions extending into the space between the members, said conveyers being mounted for movement longitudinally of the members and outwardly and laterally therefrom at one end, and stationary means located between the conveyers for guiding a fish in a straight line between the lateral portions of the conveyers for disengagement of the fish engaging portions from such a fish.

14. A fish-treating machine including spaced fish supports having upper faces arranged to receive the sides of a split fish, a fish-treating device located above the supports in position to treat a fish disposed upon the supports, a bracket mounted to extend over the supports, a vertical sleeve mounted in the bracket and extending oppositely therebeyond, a vertical rod slidably engaged in the sleeve and having a threaded portion extending above the sleeve, a member threaded upon the rod and engaging the upper end of the sleeve, a yoke carried by the lower end of the rod, rods carried by the yoke and lying one above each of the supports, and a spring engaged with the vertical rod between the yoke and the bracket and arranged to hold the vertical rod yieldably against upward movement.

15. In a fish-treating machine the combination with a fish-splitting blade, of means associated with the blade for guiding a fish against the blade so that it will be split and for spreading a fish so split, said means comprising a pair of plates mounted one at each side of the blade and diverging beyond the cutting edge of the blade, said plates also extending beyond the cutting edge of the blade in a direction at an angle to their direction of divergence, and connections between the last mentioned portions of the plates which extend beyond the blade, said connections extending across the cutting edge of the blade and being formed for engagement within the gut of a fish for the introduction of a fish to the plate whereby such a fish will be split and will have its side portions disposed against the outer edges of the plates so that the split fish will be spread.

16. In a fish-treating machine, the combination with fish supporting means of a member movable vertically with respect to the fish supporting means, means for moving the member, a sleeve disposed above the member, a rod connected with the sleeve for vertical adjustment with respect thereto, said rod extending vertically and bearing upon the member, a shaft journaled in the sleeve, said shaft and sleeve being movable vertically, a fish treating device carried by the shaft and lying above the fish supporting means, and means for revolving the shaft.

17. A fish-treating machine including a frame, a horizontal drive-shaft mounted at one side of the frame, a plurality of shafts extending laterally from the drive-shaft across the frame, said lateral shafts being mounted for vertical movement, operative connections between the drive-shaft and the lateral shafts, a bar extending beneath all of the lateral shafts, said bar being mounted in the frame for vertical movement, means for supporting the lateral shafts upon the bar against downward movement for movement of the lateral shafts upwardly with the bar, means for moving the bar vertically, a fish-treating device carried by each of the lateral shafts, and means for moving fish into engagement with the fish-treating devices successively.

18. A fish-treating machine including a drive-shaft, a shaft mounted to extend laterally from the drive-shaft and for pivotal movement with the drive-shaft as a center, driving connections between the two shafts, a bar disposed beneath the lateral shaft, means for moving the bar vertically, a mounting for the lateral shaft disposed above the bar, a member carried by the bar and contacting one side of the said mounting, a member carried by the bar and extending longitudinally of the lateral shaft, portions carried by the mounting and resting upon the member which extends longitudinally of the lateral shaft to support the mounting above the bar, said portions being adjustable to vary the space between the mounting and the bar, a fish-treating device carried by the lateral shafts and fish supporting means located below the fish-treating device in position to support a fish for treatment by the treating device.

19. In a fish-treating machine the combination with a revolubly mounted fish splitting saw of a second saw revolubly mounted in alinement with the first mentioned saw, fish conveying means mounted for movement of fish against the first mentioned saw and subsequently against the second mentioned saw, and cleaning members disposed at the sides of the second mentioned saw and mounted for rotation therewith.

20. In a fish-treating machine, the combination with a fish splitting device, of a cutting device, means for moving a fish initially to the splitting device and then to the cutting device, means for positioning a split fish with respect to the cutting device so that the spinal membrane of such a fish will be cut by the cutting device, and fish-cleaning means arranged for operation upon a fish simultaneously with the cutting device.

21. In a fish-treating machine the combination with a gut-splitter and a membrane-cutter, of means for moving fish first into engagement with the gut-splitter and then into engagement with the membrane-cutter, and means for holding a fish in position to expose its membrane to the membrane-cutter during the movement of the fish by the moving means after the fish has been split.

22. A fish-treating machine including two guides disposed in spaced relation, the ends of the guides being directed laterally and outwardly, the intermediate portions of the guides being disposed in parallel relation, said guides having upper faces inclined upwardly and outwardly, two endless belts each mounted for movement of one of its side portions to follow the inner face of one of the guides, means for moving the belts to shift the said side portions thereof in a common direction, fish gripping devices carried by the belts and arranged for movement through the space between the guides, and fish-treating devices located in position to treat fish passing between the guides.

23. In a fish-treating machine the combination with fish-supporting means, of two blades mounted in position to engage fish upon the supporting means, said blades being movable toward and away from the supporting means, and means for independently adjusting the blades with respect to the supporting means to position the blades to cut different portions of a fish upon the supports.

24. A fish-treating machine including a fish-treating device, fish supports at opposite sides of the device arranged to hold a split fish in position to receive treatment from the device, a second fish-treating device located beyond the supports and having a form different from the first mentioned treating device, pivotally mounted plates associated with the second treating device and arranged to receive portions of a fish thereupon from the supports, said plates being shaped to conform to the shape of the second treating device and being movable upon their pivots toward and away from the said treating device and means for holding the plates yieldably against movement away from the second treating device.

25. In a fish-treating machine, the combination with fish-cleaning means having oppositely beveled cleaning surfaces, of plates disposed in divergent relation to receive the cleaning means therebetween with its beveled surfaces directed toward the plates, said plates being mounted for movement toward and away from the said beveled surfaces and means for holding the plates yieldably against movement away from the beveled surfaces.

In testimony whereof, I affix my signature, in the presence of two witnesses.

NIELS C. NICHOLSON.

Witnesses:
 THOMAS A. HECKMAN,
 CORNELIUS H. HANFORD.

It is hereby certified that in Letters Patent No. 1,217,809, granted February 27, 1917, upon the application of Niels C. Nicholson, of Seattle, Washington, for an improvement in "Fish-Cleaning Machines," errors appear in the printed specification requiring correction as follows: Page 5, line 104, claim 5, strike out the word "stationary"; same page and claim, line 105, before the word "fish" insert the word *stationary;* and that the said Letters Patent should be read with these corrections therein that the same may conform to the record of the case in the Patent Office.

Signed and sealed this 8th day of May, A. D., 1917.

[SEAL.]

R. F. WHITEHEAD,

*Acting Commissioner of Patents.*

Cl. 17—10.